J. STEADMAN.
Metal Punch.
No. 2,426. Reissued Dec. 18. 1866.
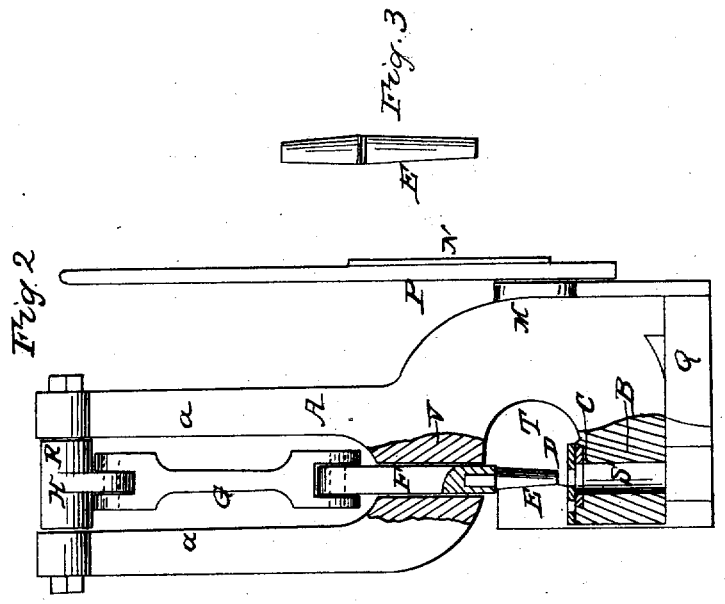
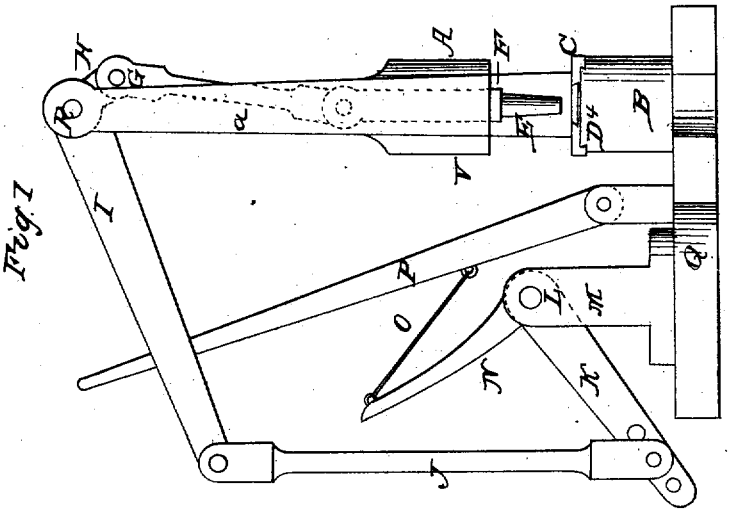
Witnesses
Wm. Crewin
Thos. Tuech.
Inventor
J. Steadman
By Munn & Co
Attys.
N. PETERS, Photo-Lithographer, Washington, D. C.

United States Patent Office.

IMPROVED PUNCHING MACHINE.

J. STEADMAN, OF PECATONICA, ILLINOIS.

*Letters Patent No.* 51,630, *dated December* 19, 1865; *reissue No.* 2,426, *dated December* 18, 1866.

The Schedule referred to in these Letters Patent and making part of the same.

TO ALL WHOM IT MAY CONCERN:

Be it known that I, J. STEADMAN, of Pecatonica, in the county of Winnebago, and State of Illinois, have invented a new and useful improvement in Machines for Punching Metal; and I do hereby declare that the following is a full, clear, and exact description thereof, which will enable others skilled in the art to make and use the same, reference being had to the accompanying drawings, forming part of this specification, in which—

Figure 1 is an elevation from a side view of a machine made according to my invention.

Figure 2 is a front view.

Figure 3 is a separate view of one of the punches.

Similar letters of reference indicate like parts.

The object of this invention is to produce a punching machine capable of being easily operated by hand for the use of blacksmiths and other mechanics, by the aid of which their work will be greatly facilitated.

A designates the frame of the machine. It rises from a platform, Q, which also sustains two standards, M, the use of which is to furnish bearings for the rock-shaft, L. The lower part of the frame is open, as at T, to form an open space through which the punch can pass on its way to the bed-plate. B is the block or pedestal which sustains the bed-plate, being made from the lower part of the frame, A. It is perforated from top to bottom, as seen at S, fig. 2, and the platform, Q, is cut away beneath the perforation, S, to allow whatever metal passes through it to reach the ground. The upper part of the frame extends over the block, B, being formed like a semi-arch, and its upper ends are forked, as at *a a*, to receive the rock-shaft, R, at top and allow room for the action of the link, G. That part of the frame from which the forks, *a a*, proceed has a perforation, V, through it to receive the socket, F, which is moved up and down through it in the operation of the machine. E designates a punch which is placed in the socket. The rock-shaft, R, carries a right-angled lever, I H, which is keyed to it, the short arm, H, of which is jointed to the link, G. The outer end of the arm I is jointed to a connecting-rod, J, whose lower end is jointed to the outer end of the arm, K, of a rock-shaft, L, supported on the standards, M M. The opposite end of the rock-shaft, L, has another arm, N, which is connected to the working or hand-lever, P, by a link, O. It will be observed that the increase of leverage is very rapid through the arrangement of levers, connecting rod, and arms above described, and a great force is obtained wherewith to bring the short arm, H, toward a vertical position, and thus drive the punch, E, through the metal to be operated upon. The bed-plate is made in two parts, C and D, whereof the part C slides in a dovetailed groove, made in the face of the part D, so as to bring openings of different sizes below the punch. The part C likewise slides in a groove made in the face of a block.

This machine is made portable and of convenient size for small shops, such as blacksmithing shops and others, in which frequent necessity arises for punching holes through plates and bars of metal, as in wagon-making, ironing wagons, and the like.

What I claim as new, and desire to secure by Letters Patent, is—

1. The socket F, sliding through the opening V, operating in combination with the link G, pivoted to the right-angled lever at its inner end, whose outer end is pivoted to the connecting-rod J, operated by the adjustable right-angular lever P, substantially as described.

2. The combination and arrangement of the link G, which drives the socket and punch F E, with the right-angled lever I H, working on the rock-shaft R, and the connecting rod J, arms K N, working on the rock-shaft L, and the link O and hand-lever P, substantially as described.

J. STEADMAN.

Witnesses:

J. B. CRATON,

T. M. WILSON.